United States Patent
Hu et al.

(10) Patent No.: US 9,760,224 B2
(45) Date of Patent: Sep. 12, 2017

(54) WIRELESS CONTROL SYSTEM, TOUCH-SENSITIVE MODULE AND MANUFACTURING METHOD OF SAME

(71) Applicant: Touchplus Information Corp., New Taipei (TW)

(72) Inventors: Shih-Hsien Hu, New Taipei (TW); Yi-Feng Wei, New Taipei (TW); Yao-Chih Chuang, Tainan (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 42 days.

(21) Appl. No.: 14/623,727

(22) Filed: Feb. 17, 2015

(65) Prior Publication Data

US 2015/0234499 A1 Aug. 20, 2015

(30) Foreign Application Priority Data

Feb. 17, 2014 (TW) .............................. 103105166 A

(51) Int. Cl.
*G06F 3/044* (2006.01)
*G05G 9/047* (2006.01)
*G06F 3/0338* (2013.01)
*G06F 3/0354* (2013.01)

(52) U.S. Cl.
CPC .............. *G06F 3/044* (2013.01); *G05G 9/047* (2013.01); *G06F 3/0338* (2013.01); *G06F 3/03547* (2013.01); *Y10T 29/49105* (2015.01)

(58) Field of Classification Search
CPC .... G06F 3/044; G06F 3/0338; G06F 3/03547; G06F 2203/04103; G05G 9/047; Y10T 29/49105

See application file for complete search history.

(56) References Cited

U.S. PATENT DOCUMENTS

| 2007/0229466 | A1* | 10/2007 | Peng ................. G06F 3/044 345/173 |
| 2011/0285454 | A1* | 11/2011 | Bayramoglu ........... G06F 3/046 327/517 |
| 2014/0035865 | A1 | 2/2014 | Hu |
| 2014/0097857 | A1 | 4/2014 | Hu |
| 2014/0097885 | A1 | 4/2014 | Hu |
| 2014/0232691 | A1* | 8/2014 | Lee .................... G06F 3/044 345/174 |
| 2015/0234499 | A1* | 8/2015 | Hu .................... G06F 3/044 345/174 |

FOREIGN PATENT DOCUMENTS

| TW | 201205409 | 2/2012 |
| TW | 201415334 | 4/2014 |

* cited by examiner

*Primary Examiner* — Amare Mengistu
*Assistant Examiner* — Jennifer Zubajlo
(74) *Attorney, Agent, or Firm* — WPAT, PC

(57) ABSTRACT

A wireless control system, a touch-sensitive pad structure, a touch-sensitive module and a method for manufacturing the touch-sensitive module are provided. The wireless control system includes a controlled device and a remote controller which includes the touch-sensitive module. The touch-sensitive module includes a plurality of sensor pads. The controlled device is controlled by detecting changes of physical properties of the sensor pads without touching the sensor pads.

13 Claims, 7 Drawing Sheets

WIRELESS CONTROL SYSTEM, TOUCH-SENSITIVE MODULE AND MANUFACTURING METHOD OF SAME

FIELD OF THE INVENTION

The present disclosure relates to a wireless control system, and particularly to a touch-sensitive module used in the wireless control system and a manufacturing method of the touch-sensitive module.

BACKGROUND OF THE INVENTION

Gesture sensing/touch sensing technology has been widely used in 2D or 3D control field and applied to household appliances and industrial equipments. For example, the technology is applied to TV remote controllers, touch screens, keyboards and in-vehicle control interfaces.

In a control device with gesture sensing/touch sensing function, a touch-sensitive module is configured to only receive data input. The received data should be processed and then emitted through a signal transmitting unit. Since more and more kinds of data input are utilized to achieve intuitive control, the quantity of the touch-sensitive modules rapidly increase and coupling between the touch-sensitive modules and circuits/elements in the control device becomes much complicated. Therefore, a novel touch-sensitive module with the advantage of easy manufacturing process and simple coupling method is desired.

SUMMARY OF THE INVENTION

An aspect of the present disclosure provides a touch-sensitive pad structure. The touch-sensitive pad structure includes a first sensor pad, a second sensor pad disposed beside the first sensor pad, and a lead frame. The lead frame includes a main frame and a plurality of frame branches. Each frame branch has a first end and a second end wherein the first end is connected to one of the first sensor pad and the second pad and the second end is connected to the main frame.

In an embodiment, the touch-sensitive pad structure includes another second sensor pad and a wire electrically connecting the two second sensor pads.

In an embodiment, the touch-sensitive pad structure further includes a processing chip. The processing chip is disposed on the first sensor pad, disposed in a hallow portion of the first sensor pad or disposed between the first sensor pad and the second sensor pad. The processing chip transmits or receives an electrical signal through one of the frame branches connected to the first sensor pad.

In an embodiment, the touch-sensitive pad structure further includes a circuit chip disposed between the first sensor pad and the second sensor pad and a plurality of wires. Each wire is electrically connected to the circuit chip and one of the first sensor pad and the second sensor pad.

Another aspect of the present disclosure provides a touch-sensitive module. The touch-sensitive module includes a first sensor pad; a second sensor pad disposed beside the first sensor pad; a wrapper covering the first sensor pad and the second sensor pad; and a plurality of leads. Each lead is electrically connected to one of the first sensor pad and the second sensor pad, and protrudes from the wrapper to transmit electrical signals generated by the first sensor pad or the second sensor pad.

In an embodiment, the wrapper is made of an insulating material.

In an embodiment, the touch-sensitive module further includes a processing chip disposed on the first sensor pad, disposed in a hallow portion of the first sensor pad or disposed between the first sensor pad and the second sensor pad. The processing chip is electrically connected to the leads.

In an embodiment, the touch-sensitive module further includes a circuit chip and a plurality of wires. The circuit chip is disposed between the first sensor pad and the second sensor pad or disposed on one of the first sensor pad and the second sensor pad wherein the circuit chip, the first sensor pad and the second sensor pad are disposed on different planes with different heights. Each wire is electrically connected to the circuit chip and one of the first sensor pad and the second sensor pad.

In one embodiment, the circuit chip is a light-emitting diode chip providing various illuminating effects according to touch actions on the touch-sensitive module.

In one embodiment, the first sensor pad and the second sensor pad are made of a flexible material.

A further aspect of the present disclosure provides a wireless control system. The wireless control system includes a touch-sensitive module and a controlled device. The touch-sensitive module includes a plurality of sensor pads; a wrapper covering the sensor pads and receiving a touch action; and a processing chip electrically connected to the sensor pads. The processing chip generates an internal control signal in response to changes of physical properties of the sensor pads resulting from a touch action near the wrapper in a first instance. The processing chip drives the sensor pads to change the physical properties of the sensor pads in response to an external control signal in a second instance. The controlled device includes a sensing module configured to detect the changes of the physical properties of the sensor pads behind the wrapper and generate a sensing signal wherein the controlled device is controlled in response to the sensing signal.

In an embodiment, the controlled device achieves authentication of the touch-sensitive module according to the sensing signal.

In an embodiment, the physical property is capacitance.

A further aspect of the present disclosure provides a method for manufacturing a touch-sensitive module. At first, a first sensor pad, a second sensor pad and a lead frame are formed. The lead frame includes a main frame and a plurality of frame branches. Each frame branch has a first end and a second end wherein the first end is connected to one of the first sensor pad and the second sensor pad, and the second end is connected to the main frame. Then, a wrapper covering the first sensor pad and the second sensor pad is formed. The main frame is removed to form the touch-sensitive module wherein leads connected to the first sensor pad and the second sensor pad are formed from the frame branches. The leads protrude from the wrapper.

In an embodiment, the first sensor pad, the second pad and the lead frame are integrally formed by a metal stamping process. The wrapper is formed by injection molding. The main frame is removed by a cutting process.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
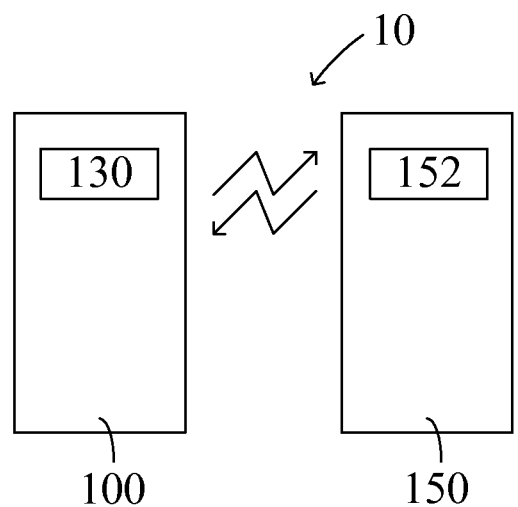
FIG. 1 is a schematic diagram illustrating a wireless control system.

Please refer to FIG. 1, a schematic diagram illustrating a wireless control system. The wireless control system 10 at least includes a remote controller 100 and a controlled device 150. The controlled device 150 includes a sensing module 152 which can handshake with the remote controller 100 to establish a communication channel therebetween. Therefore, the remote controller 100 can issue control signals to control the controlled device 150. The remote controller 100 may further include a touch-sensitive module 130 for sensing touch actions/gestures of the user and transforming the sensed touch actions/gestures into remote control signals for operating a user interface (not shown) of the controlled device 150. To be specific, the touch-sensitive module 130 is a capacitive touch-sensitive module.

Figure 2:
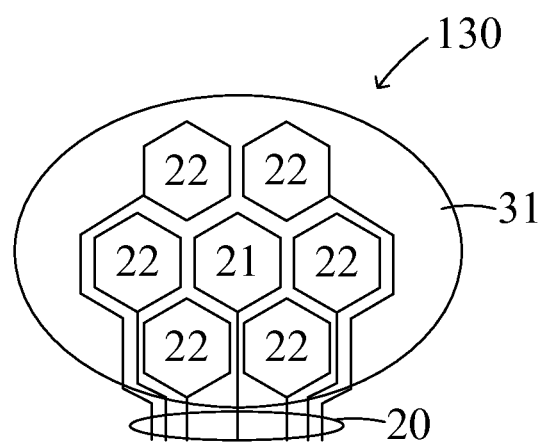
FIG. 2 is a schematic diagram illustrating a structure of a capacitive touch-sensitive module according to an embodiment of the present invention.

The structure of a capacitive touch-sensitive module is shown in FIG. 2. The capacitive touch-sensitive module 130 includes several sensor pads. In this embodiment, there are a first sensor pad 21 and six second sensor pads 22 surrounding the first sensor pad 21. It is to be noted that the shape, the number and the relative positions of the sensor pads 21 and 22 are not limited to this embodiment and any proper modification to them are involved in the present disclosure. The layout of the sensor pads 21 and 22 is arranged in a one-dimensional mode. The sensor pads 21 and 22 are electrically isolated from each other. For each sensor pad 21 or 22, capacitance changes with approaching of a touch object such as a finger. Electrical signals generated by the sensor pads 21 and 22 are transmitted to a processing chip (not shown) through corresponding leads 20, respectively. The capacitive touch-sensing module 130 and the processing chip are covered and protected by a wrapper 31. The processing chip can determine user touch actions/gestures from position(s)/position change of the touch object by certain operation. Therefore, user touch actions/gestures near the sensor pads 21 and 22 can be sensed to generate control signals for operating the user interface of the controlled device 150. The detailed description can be read from patent applications of TW 201415334, US 2014/0097857 and US 2014/0097885, which are incorporated herein for reference.

Figure 3:
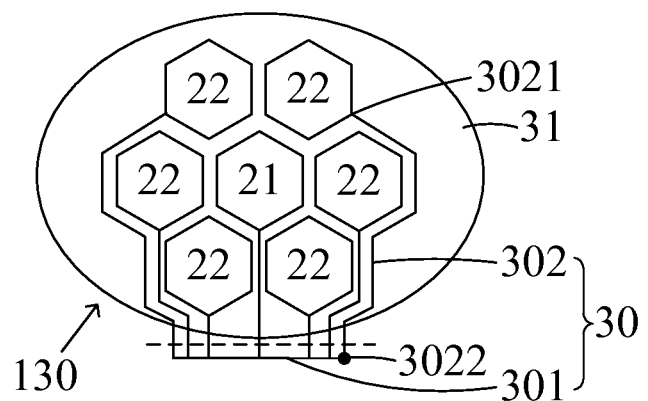
FIG. 3 is a schematic diagram illustrating a capacitive touch-sensitive pad structure including a lead frame according to an embodiment of the present invention.

To simplify the manufacturing method of the one-dimensional capacitive touch-sensitive module, a lead frame is used. A touch-sensitive pad structure which can be considered as a semiproduct of the touch-sensitive module 130 is shown in FIG. 3. The sensor pads 21 and 22 are connected to a lead frame 30 respectively. The lead frame 30 includes a main frame 301 and several frame branches 302. Each frame branch 302 has a first end 3021 and a second end 3022 wherein the first end 3021 and the second end 3022 are connected to only one sensor pad (21 or 22) and the main frame 301, respectively. The main frame 301 and the frame branches 302 of the lead frame 30 together with the sensor pads 21 and 22 form a planar structure and can be easily manufactured by a metal stamping process to provide an integrally-formed product. If narrow line width is required, an etching method is applicable. The material of the touch-sensitive pad structure may be metal, conductive polymer, conductive rubber or other conductive material which can be processed by stamping or etching. A flexible material, e.g. the conductive rubber, is a better choice among these materials. In an alternative embodiment, the touch-sensitive pad structure may be formed by covering nonconductive material with conductive material, for example, plastic body electroplated with metal layer. Then, the whole structure except the main frame 301 is covered by a wrapper 31 to fix and protect the sensor pads 21 and 22. In an embodiment, the wrapping procedure is performed by injection molding, and then the main frame 301 is removed by cutting along the dotted line. Thus, the capacitive touch-sensitive module of FIG. 2 is obtained. The touch surface of the wrapper 31 may be a plat surface or a curved surface, and the wrapper 31 is made of an insulating material. The material of the wrapper 31 may be transparent, translucent or opaque. The leads 20 (formed from the frame branches 302) of the touch-sensitive module 130 protrude from the wrapper 31. The leads 20 are electrically connected to a ribbon cable (not shown) so that the electrical signals generated by the sensor pads 21 and 22 can be transmitted to other circuits or elements through the leads 20 and the ribbon cable. Therefore, a touch control module (not shown) cooperated with the touch-sensitive module 130 can be electrically connected to the leads 20 through suitable signal lines to determine the sensed gestures/touch actions by certain operation of the electrical signals from the touch-sensitive module 130.

Figure 4A:
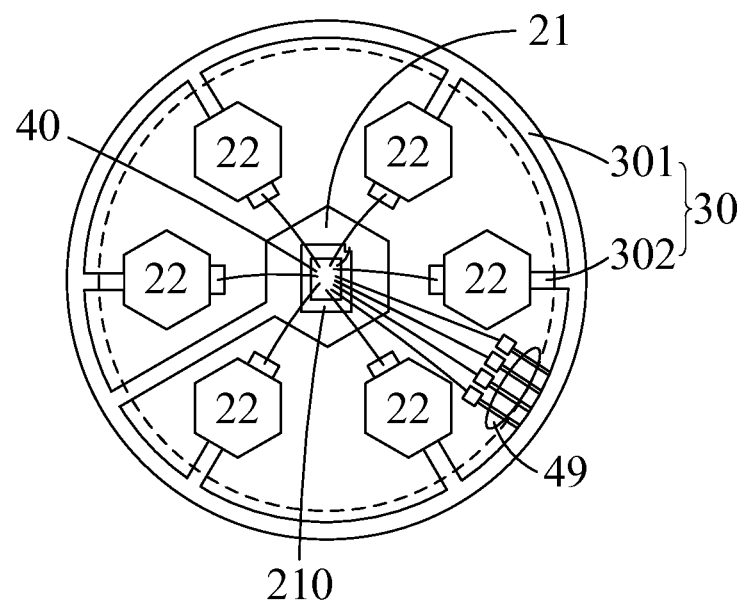
FIG. 4A is a top view illustrating a capacitive touch-sensitive pad structure including a lead frame according to another embodiment of the present invention.
Figure 4B:
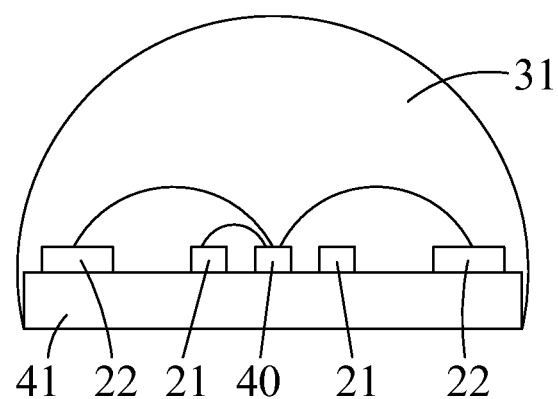
FIG. 4B is a cross-sectional side view of a capacitive touch-sensitive module manufactured from the capacitive touch-sensitive pad structure of FIG. 4A.

Please refer to FIG. 4A and FIG. 4B illustrating another embodiment of the present invention. In this embodiment, the processing chip 40 is integrated in the touch-sensitive module 130. There is a hollow portion 210 in the first sensor pad 21 for accommodating the processing chip 40. The sensor pads 21 and 22, the lead frame 30 and the processing chip 40 are disposed on a substrate 41 (FIG. 4B). The leads 20 (formed from the lead branches 302) are electrically connected to the processing chip 40 via wire bonding, while the processing chip 40 is also electrically connected to pins 49 via wire bonding. The substrate 41 may be implemented by a heat sink. In addition, the substrate 41 may include a metal layer (not shown) to serve as a ground plane to shield against electrical noise and interference. Furthermore, a driving voltage may be supplied on the sensor pads 21 and 22 via the metal layer to increase sensitivity and sensible distance of the touch-sensitive module 130. As described in the above embodiment, the lead frame 30 may be integrally formed by a metal stamping process. The wrapper 31 is formed to cover the whole structure except the main frame 301, i.e. covering the sensor pads 21 and 22, the frame branches 302, the processing chip 40 and the substrate 41. For example, the wrapping procedure is performed by injection molding, and then the main frame 301 is removed by cutting the whole structure along the dotted circle. The touch surface of the wrapper 31 may be a plat surface or a curved surface, and the wrapper 31 is made of an insulating material. The material of the wrapper 31 may be transparent, translucent or opaque. In another embodiment, the processing chip 40 may be disposed between two of the sensor pads 21 and 22. In a further embodiment, the processing chip 40 may be disposed on one of the surfaces of the sensor pads 21 and 22. Under this condition, an insulating layer (not shown) is interposed between the processing chip 40 and the underlying sensor pad 21 or 22, or pins of the processing chip 40 are electrically connected to the underlying sensor pad 21 or 22. In addition to the processing chip 40, a battery, a wireless communication chip or other circuit chip which is required for the remote controller 100 may be disposed in and integrated into the touch-sensitive module 130 in the same manner. The circuit chip is wrapped together with the sensor pads 21 and 22 and the leads 20.

According to the present disclosure, the touch-sensitive module has limited sensor pads. The concept of the present disclosure is breaking up the whole into parts. The size of the remote controller 100 can be greatly reduced, e.g. like a button. Therefore, the present disclosure gains advantage over other remote controller. Furthermore, one touch-sensitive module 130 may be solely provided in a remote controller 100 to perform the touch-sensing action, or several touch-sensitive modules 130 may be combined together to provide a large-area touch-sensitive module. Besides, several small touch-sensitive modules can be disposed at different areas of the remote controller 100 to achieve flexible design and application. Although the capacitive touch-sensitive module 130 is described in the above embodiments for illustration, it is to be noted that other type of touch-sensitive module is also applicable for all embodiments, e.g. piezoelectric touch-sensitive module whose sensor pads are made of piezoelectric material capable of sensing pressure.

Figure 5:
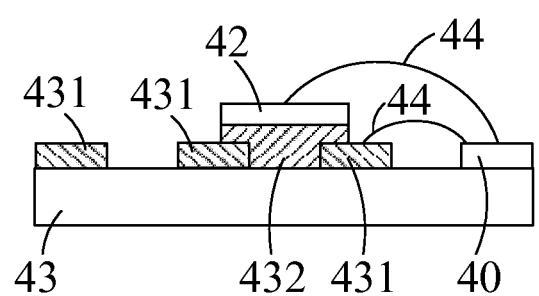
FIG. 5 is a side view of a capacitive touch-sensitive module having a LED unit according to a further embodiment of the present invention.

If the wrapper 31 is transparent or translucent, a light-emitting diode (LED) unit controlled by the processing chip 40 may be displaced within the wrapper 31. The brightness and/or color of the light-emitting diode unit changes with the touch-sensing result of the sensor pads 21 and 22. In other words, the light-emitting diode unit provides various illuminating effects according to the sensed gesture/touch action. Please see the structure in FIG. 5 wherein the transparent wrapper 31 is not shown for clarity and a heat sink is additionally provided. In the structure, a metal layer 431 is formed in a similar way to the sensor pads in the above embodiments. A great portion of the metal layer 431 serves as a conductive portion of the heat sink 43 which is connected to the light-emitting diode unit 42 by an insulating thermal paste 432. Another portion of the metal layer 431 serves as sensor pads. The sensor pads and the light-emitting diode unit 42 are electrically connected to the processing chip 40 by wires 44 so that the processing chip 40 can process touch-sensing action of the sensor pads and control illumination of the light-emitting diode unit 42.

Figure 6:
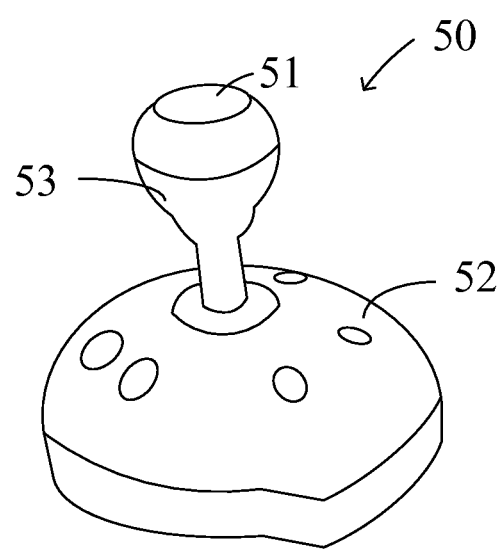
FIG. 6 is a perspective view illustrating an input device having the touch-sensitive module.

The touch-sensitive modules in the above embodiments may be used in different types of input devices, e.g. input devices for computers or other information systems. FIG. 6 shows a joystick having a touch-sensitive module according to the present disclosure. The joystick 50 includes a base 52 and a stick 53. The touch-sensitive module 51 is disposed at a top of the stick 53. The user moves the stick 53 or touches the touch-sensitive module 51 to control movement of a cursor or an object on the screen. For better control, moving the stick 53 results in fast movement of the cursor or object, while operating the touch-sensitive module 51 results in fine movement of the cursor or object. Therefore, the user can move the stick 53 to rapidly move the cursor near a target position, and then wag his finger or pass his finger over the touch-sensitive module 51 to move the cursor to the precise target position. The control chip (not shown) corresponding to the stick 53 and the processing chip of the touch-sensitive module 51 may be separately provided in the joystick 50 or integrated in one chip according to the real application. For other applications, the touch-sensitive module 51 is provided as a user interface mounted in a vehicle or a cabin of a boat to be operated by a driver/pilot or passengers.

Furthermore, the touch-sensitive module of the present disclosure can sense floating touch. Therefore, the touch-sensitive module can sense finger movement parallel to the touch surface of the ouch-sensitive module and finger movement toward/away from the touch-sensitive module. According to this technology, a virtual key is formed above the touch surface of the touch-sensitive module. To sense floating touch, overall capacitance change of a group of sensor pads can be calculated to determine the distance between the touch surface and the user finger, palm or other conductive touch object. There is predefined relation between the number of the sensor pads and the sensible distance. For example, seven sensor pads can sense larger range than three sensor pads by detecting overall capacitance change of the sensor pads. Detailed description about grouping of sensor pads can be read from patent applications of TW 201415334, US 2014/0097857 and US 2014/0035865, which are incorporated herein for reference. Since the sensible distance of the capacitive touch-sensitive module is determined by the grouping size, continuing changing the grouping size can be considered as a scan action toward/away from the capacitive touch-sensitive module. After the user operate the capacitive touch-sensitive module to move a cursor to an icon on a panel including the touch-sensitive module, when the user finger moves toward the panel, the capacitive touch-sensitive module can detect this "press" action and make the icon deform such as curving inward to respond to the "press" action. For example, when the capacitive touch-sensitive module detects and realizes that the distance between the panel and the user finger becomes smaller than a threshold distance value, animation effects to the icon, e.g. rupture may be shown. Then, the panel performs a specific function represented by the icon.

Figure 7:
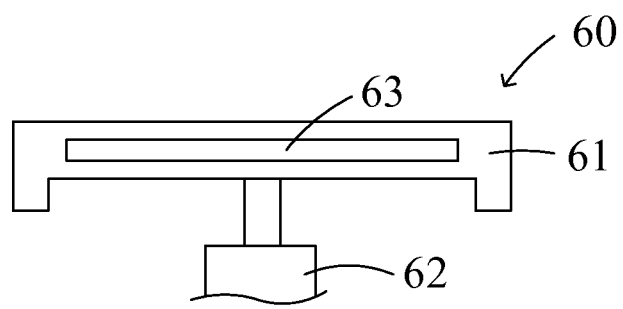
FIG. 7 is a schematic diagram illustrating a button of a keypad having the touch-sensitive module.

Please refer to FIG. 7 showing a button of a keypad or a keyboard. The button 60 includes a keycap 61 and a keyswitch 62 wherein the touch-sensitive module 63 is disposed in the keycap 61 of the button 60. On one hand, the buttons 60 with the touch-sensitive module 63 are pressed to provide character or functional input. One the other hand, one or more buttons 60 with the touch-sensitive module 63 can serve as a touchpad. The touch-sensitive module 63 senses touch action on the button(s) 60 to control the cursor or object to move on the information system. Polar coordinate system is used in movement control of the cursor or object. For example, the touch-sensitive module 63 senses a distance and an angle of the touch point relative to a fixed center point. Thus, the cursor is controlled to move according to the sensed distance and angle. The velocity of the cursor is in proportion to the distance and the moving direction corresponds to the angle.

Please refer back to FIG. 1. The sensing module 152 of the controlled device 150 may be implemented by the above-described touch-sensitive module. The processing chip 40 of the touch-sensitive module 130 issues different voltage signals to drive the sensor pads 21 and 22 of the touch-sensitive module 130 in response to an external control signal. The voltage signal distribution among the sensor pads 21 and 22 may be considered as a code. Furthermore, the voltage signals may have rapid-switching/changing waveforms to change the voltage signal distribution with time. Each remote controller 100 has its own code(s) to be recognized. The sensing module 152 with floating touch function can detect the capacitance changes between the touch-sensitive module 130 and the sensing module 152 to generate a corresponding sensing signal. Thus, the controlled device 150 can decide whether the communication channel should be established according to the sensing signal indicating the capacitance changes corresponding to the code(s) of the remote controller 100. Thus, authentication of the remote controller 100 is achieved. It is to be noted that capacitive touch-sensing function is described for illustration. In fact, the touch-sensing module 130 and the sensing module 152 can achieve the authentication through other touch-sensing method. It is only required that physical properties of the sensor pads of the touch-sensing module 130 are changed in a particular mode, and the sensing module 152 can detect the changes of the physical properties.

In this embodiment, the processing chip 40 can receive or issue control signals in different situations. In a first instance, the processing chip 40 detects the changes of the physical properties (e.g. capacitance changes) of the sensor pads resulting from an approaching touch object, and issues an internal control signal to control a designated element (not shown). In as second instance, the processing chip 40 receives an external control signal from other control element (not shown). The processing chip 40 drives the sensor pads and changes the physical properties (e.g. capacitance changes) of the sensor pads in a particular mode in response to the external control signal.

Figure 8A:
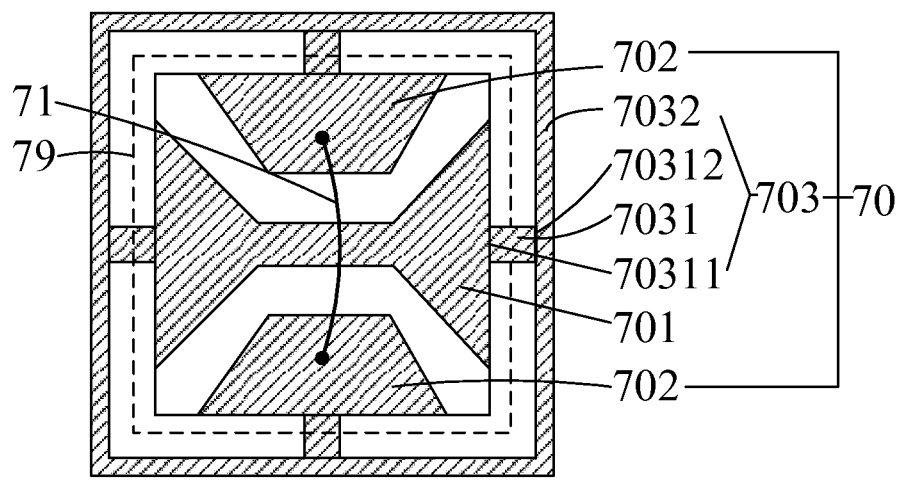
FIGS. 8A-8C are top views illustrating capacitive touch-sensitive pad structures according to further embodiments of the present invention.

Please refer to FIG. 8A, a top view illustrating a capacitive touch-sensitive pad structure according to the present disclosure. The capacitive touch-sensitive pad structure 70 is manufactured by a metal stamping process. The capacitive touch-sensitive pad structure 70 includes a first sensor pad 701, second sensor pads 702 and a lead frame 703. The lead frame 703 includes a main frame 7032 and several frame branches 7031. Each frame branch 7031 has a first end 70311 and a second end 70312 wherein the first end 70311 is connected to only one sensor pad (701 or 702) and the second end 70312 is connected to the main frame 7032. The two second sensor pads 702 are electrically connected via wire bonding. The wire 71 across the first sensor pad 701 is isolated from the first sensor pad 701. Then, the capacitive touch-sensitive pad structure 70 except the main frame 7032 is wrapped by, for example, injection molding. The pad structure 70 is cut along the dotted square 79 to remove the main frame 7032 and a portion of the frame branches 7031 to obtain the capacitive touch-sensitive module. A plurality of the capacitive touch-sensitive modules may be combined in a regular pattern to from a touch panel. Therefore, the manufacturing process is flexible to provide the touch panels with various sizes by combining proper quantity of the touch-sensitive modules.

Figure 8B:
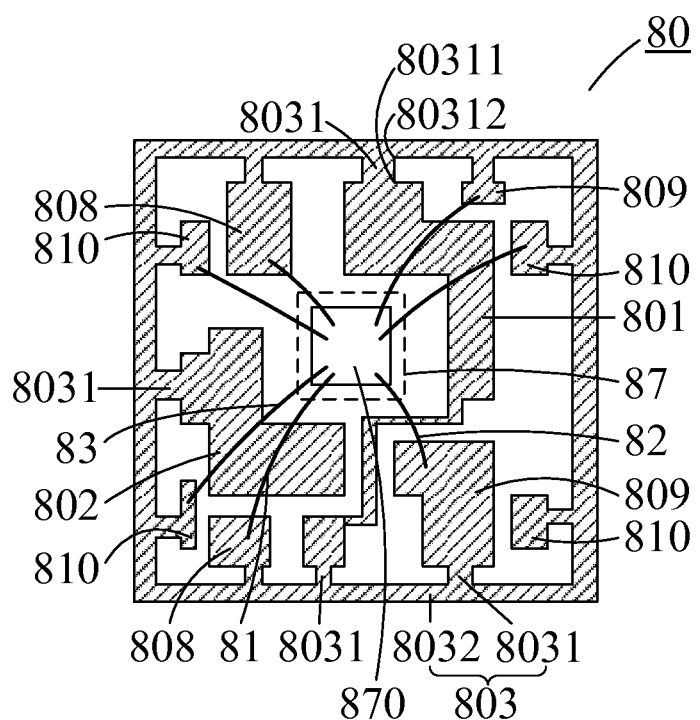

FIG. 8B illustrates another capacitive touch-sensitive pad structure according to the present disclosure. The capacitive touch-sensitive pad structure 80 is manufactured by a metal stamping process. The capacitive touch-sensitive pad structure 80 includes a first sensor pad 801, a second sensor pad 802, power pads 808, grounding pads 809, signal pads 810 and a lead frame 803. The lead frame 803 includes a main frame 8032 and several frame branches 8031. Each frame branch 8031 has a first end 80311 and a second end 80312 wherein the first end 80311 is connected to one of the first sensor pad 801, the second sensor pad 802, the power pads 808, the grounding pads 809 and the signal pads 810, while the second end 80312 is connected to the main frame 8032. The dotted square 87 indicates where a circuit chip 870 may be disposed. The power pads 808, the grounding pads 809 and the signal pads 810 are respectively electrically connected to the circuit 870 via wires 81, 82 and 83 by wire bonding, but the present disclosure are not limited to this interconnection method. Then, a portion of the capacitive touch-sensitive pad structure 80 is wrapped by, for example, injection molding. The main frame 8032 and a portion of the frame branches 8031 are cut off to form the capacitive touch-sensitive module with the embedded circuit chip 870. A plurality of the capacitive touch-sensitive modules may be combined in a regular pattern wherein the embedded circuit chips 870 are selected from more than one circuit chip, e.g. light-emitting diode chip and/or sensor chip. In this instance, the light-emitting diode chip is controlled by control signals received through the signal pads 810. Alternatively, the sensor chip issues sensed parameters through the signal pads 810. For example, the sensor chip is a piexoelectric sensor capable of sensing pressure exerted on the sensor pads. It is to be noted that the present disclosure does not limit the location of the circuit chip 870. The circuit chip 870 may be disposed among the sensor pads, disposed in a hallow portion of one sensor pad or mounted on a surface of one of the pads 801, 802, 808, 809 and 810 by an insulating adhesive material. The surface is a top surface, a bottom surface or a lateral surface of the pad.

Figure 8C:
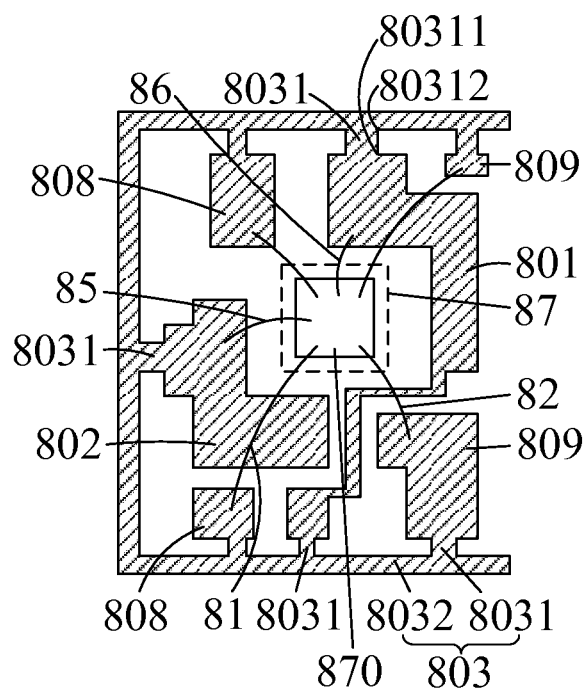

FIG. 8C illustrates another capacitive touch-sensitive pad structure according to the present disclosure. The structure is similar to the structure shown in FIG. 8B except that the signal pads 810 are eliminated. In this instance, the external signals are received through the first sensor pad 801 and the second pad 802. The circuit chip 870 is electrically connected to the first sensor pad 801 and the second pad 802 by wires 86 and 85. Thus, by taking advantage of time-division multiplexing (TDM) method, the first sensor pad 801 and the second sensor pad 802 are driven to perform touch-sensing actions during first time slots, and controlling of the circuit chip 870 is performed during second time slots. For other cases, the circuit chip 870 is disposed on a surface of the first sensor pad 801 or the second sensor pad 802. Under this condition, an insulating layer (not shown) is interposed between the circuit chip 870 and the underlying sensor pad 801 or 802, or pins of the circuit chip 870 are electrically connected to the underlying sensor pad 801 or 802. If the circuit chip is a light-emitting diode chip, and a P-type electrode or a N-type electrode is formed at a bottom of the light-emitting diode chip, the light-emitting diode chip can be directly disposed on the first sensor pad 801 or the second sensor pad 82 to form electrical connection between them without any wire.

Figure 9:
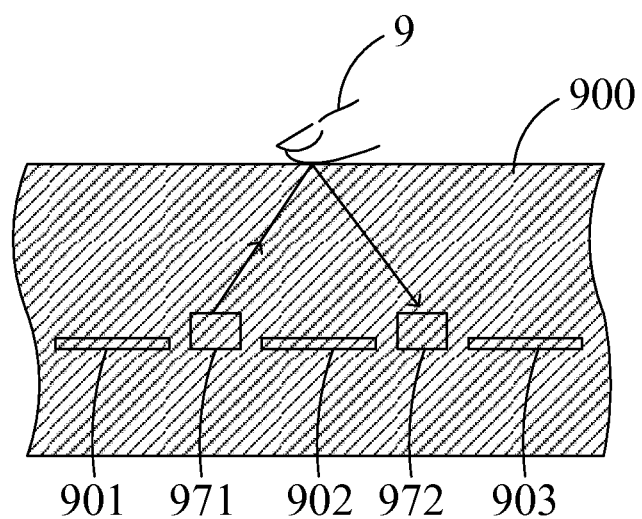
FIG. 9 is a schematic diagram illustrating a touch-sensitive module with fingerprint authentication function according to the present disclosure.

FIG. 9 illustrates a touch-sensitive module with fingerprint authentication function. In this touch-sensitive module, two circuit chips 971 and 972 are provided, e.g. light-emitting diode chip 971 and image sensor chip 972. The circuit chips 971 and 972 may be disposed as described in the above embodiments, e.g. disposed between two sensor pads, disposed in a hallow portion of one sensor pad, mounted on a surface of one sensor pad by an insulating adhesive material, or disposed at other proper position. Thus, the light-emitting diode chip 971 and the image sensor chip 972 can detect a fingerprint of the finger 9 touching the protection structure 900 (e.g. a wrapper with or without a cover lens). When the touch-sensitive module is idle, the circuit chips 971 and 972 are off to decrease power consumption. Once the sensor pads 901, 902 and 903 detect that a user finger touches the protection structure 900, the circuit chips 971 and 972 are switched on to perform fingerprint authentication. After passing the fingerprint authentication, the user can perform further touch operation on the touch-sensitive module. The sensor pads 901, 902 and 903 and the circuit chips 971 and 972 are wrapped by injection molding. The protection structure 900 is made of a transparent material. Nevertheless, if the protection structure 900 is translucent or opaque, a through hole or a light-guiding element may be provided on the light path to allow the light transmission.

The lead frame, the sensor pads, the heat sink and the circuit chip may be arranged on the same plane or at different heights and angles. The present disclosure does not limit the relative positions of them. The layout varies to meet different requirements. For example, the illuminating surface of the light-emitting diode chip is orthogonal to the lead frame.

In conclusion, the wireless control system, the touch-sensitive module and the touch-sensitive pad structure according to the present disclosure can satisfy wide requirements for remote control or touch control. The modular design of the touch-sensitive module enhances the flexibility and the application of the present disclosure. The proposed touch-sensitive pad structure facilitates simplifying the manufacturing method of the touch-sensitive module.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch-sensitive module, comprising:
   a first sensor pad;
   a second sensor pad disposed beside the first sensor pad;
   a wrapper covering the first sensor pad and the second sensor pad and filling a space between the first sensor pad and the second sensor pad; and
   a plurality of leads each of which is electrically connected to one of the first sensor pad and the second sensor pad, and protrudes from the wrapper to transmit electrical signals generated by the first sensor pad or the second sensor pad.

2. The touch-sensitive module according to claim 1 wherein the wrapper is made of an insulating material.

3. The touch-sensitive module according to claim 1, further comprising a processing chip disposed on the first sensor pad, disposed in a hallow portion of the first sensor pad or disposed between the first sensor pad and the second sensor pad, the processing chip being electrically connected to the leads.

4. The touch-sensitive module according to claim 1, further comprising:
   a circuit chip disposed between the first sensor pad and the second sensor pad or disposed on one of the first sensor pad and the second sensor pad wherein the circuit chip, the first sensor pad and the second sensor pad are disposed on different planes with different heights; and
   a plurality of wires each of which is electrically connected to the circuit chip and one of the first sensor pad and the second sensor pad.

5. The touch-sensitive module according to claim 4, wherein the circuit chip is a light-emitting diode chip providing various illuminating effects according to touch actions on the touch-sensitive module.

6. The touch-sensitive module according to claim 1 wherein the first sensor pad and the second sensor pad are made of a flexible material.

7. A wireless control system, comprising:
   a touch-sensitive module comprising:
      a plurality of sensor pads;
      a wrapper covering the sensor pads and receiving a touch action; and
      a processing chip electrically connected to the sensor pads, the processing chip generating an internal control signal in response to changes of physical properties of the sensor pads resulting from a touch action near the wrapper in a first instance, the processing chip driving the sensor pads to change the physical properties of the sensor pads in response to an external control signal in a second instance; and
   a controlled device comprising a sensing module, the sensing module detecting the changes of the physical properties of the sensor pads behind the wrapper and generating a sensing signal wherein the controlled device is controlled in response to the sensing signal.

8. The wireless control system according to claim 7 wherein the controlled device achieves authentication of the touch-sensitive module according to the sensing signal.

9. The wireless control system according to claim 7, wherein the physical property is capacitance.

10. A method for manufacturing a touch-sensitive module, comprising steps of:
    forming a first sensor pad, a second sensor pad and a lead frame, the lead frame comprising a main frame and a plurality of frame branches, each of the frame branches having a first end and a second end wherein the first end is connected to one of the first sensor pad and the second sensor pad, and the second end is connected to the main frame;
    forming a wrapper covering the first sensor pad and the second sensor pad; and
    removing the main frame to form the touch-sensitive module wherein leads connected to the first sensor pad and the second sensor pad are formed from the frame branches, the leads protruding from the wrapper.

11. The method according to claim 10, wherein the first sensor pad, the second pad and the lead frame are integrally formed by a metal stamping process, the wrapper is formed by injection molding, and the main frame is remove by a cutting process.

12. A touch-sensitive module, comprising:
    a first sensor pad;
    a second sensor pad disposed beside the first sensor pad;

a first circuit chip disposed between the first sensor pad and the second sensor pad or disposed on one of the first sensor pad and the second sensor pad;

a second circuit chip disposed between the first sensor pad and the second sensor pad or disposed on one of the first sensor pad and the second sensor pad; and a wrapper covering the first sensor pad, the second sensor pad, the first circuit chip and the second circuit chip, the first circuit chip and the second circuit chip being switched on if the sensor pads detect a touch operation on the touch-sensitive module.

13. The touch-sensitive module according to claim 12, wherein the first circuit chip and the second circuit chip are a light-emitting diode chip and an image sensor chip, respectively, to sense a fingerprint during the touch operation.

* * * * *